May 22, 1962  N. V. BEAMAN ETAL  3,035,725
DOUGH BOWL HOIST

Filed Feb. 4, 1958  5 Sheets-Sheet 5

INVENTORS
NORMAN V. BEAMAN
ROBERT M. BROOMALL
BY Bailey, Stephens & Huettig
ATTORNEYS

3,035,725
DOUGH BOWL HOIST
Norman V. Beaman, Cincinnati, Ohio, and Robert M. Broomall, Fort Thomas, Ky., assignors to C. J. Patterson Company, Kansas City, Mo., a corporation of Missouri
Filed Feb. 4, 1958, Ser. No. 713,220
6 Claims. (Cl. 214—302)

This invention relates to a hoist. In particular the invention is directed to a hoist for lifting and dumping bowls containing bread dough and the like.

In commercial baking, the dough for making bread, rolls, and like is fermented in troughs or bowls. The fermented dough is then removed from the bowl and placed in the hopper of a dough divider. The dough alone weighs about from 400 to 600 pounds while the bowl weighs about 600 pounds. Formerly the dough was manually cut into pieces and lifted by hand and thrown into the hopper or the bowl was hoisted by a crude mechanism and the dough dumped into the hopper. As the dough is a sticky mass, in either case, the dough was scraped by hand.

The object of this invention is to lift the bowl containing the dough up above the hopper and invert the bowl so that the whole dough mass drops out cleanly into the divider hopper.

In general, these objects are accomplished by forming a hoist composed of a pair of tracks for sprocket chains. A cradle is secured to these chains. Trunnions on the bowl are engaged with the cradle. The sprocket chains then pull the cradle upwardly and over an arc above the divider hopper at which point the movement of the cradle is such as to invert the bowl and causing the dough to drop cleanly out of the bowl into the hopper. A reverse movement of the chains lowers the cradle to floor level whereupon the bowl is removed from the cradle.

The means by which the objects of the invention are obtained are disclosed more fully with reference to the accompanying drawings, in which.

Figure 1:
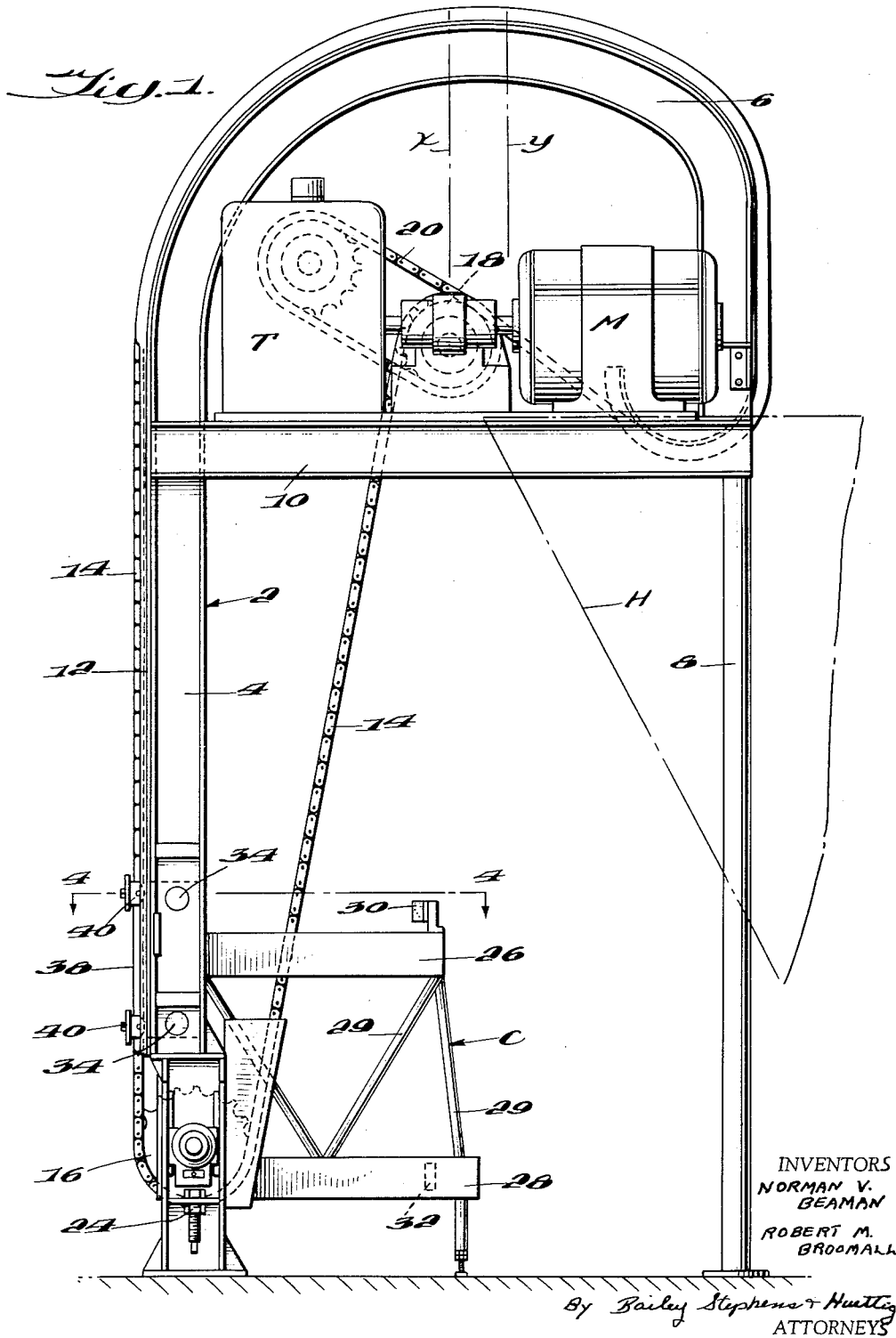
FIGURE 1 is a side elevational view of the hoist.
Figure 2:
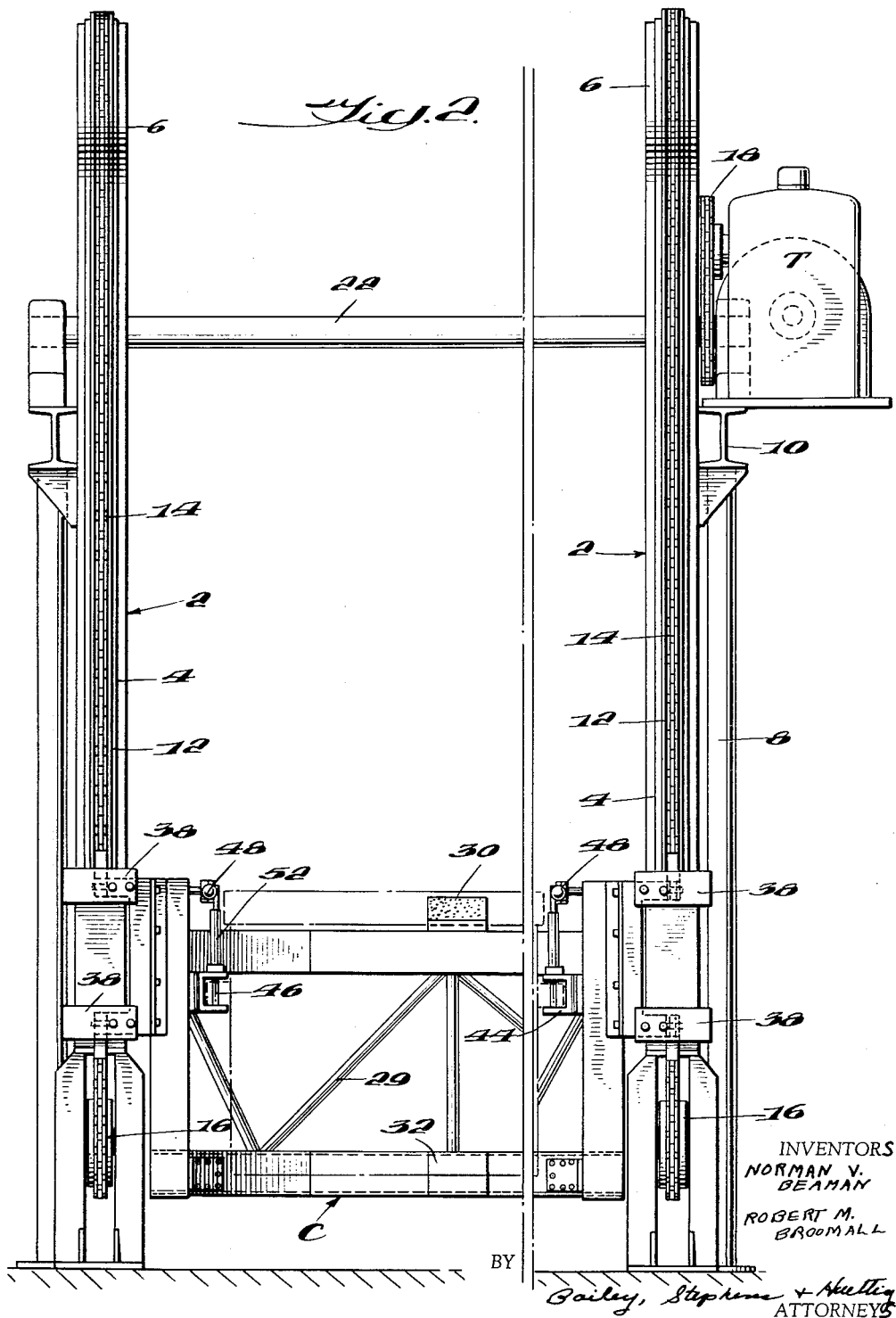
FIGURE 2 is a view of the left side of FIGURE 1 showing the front of the hoist.
Figure 3:
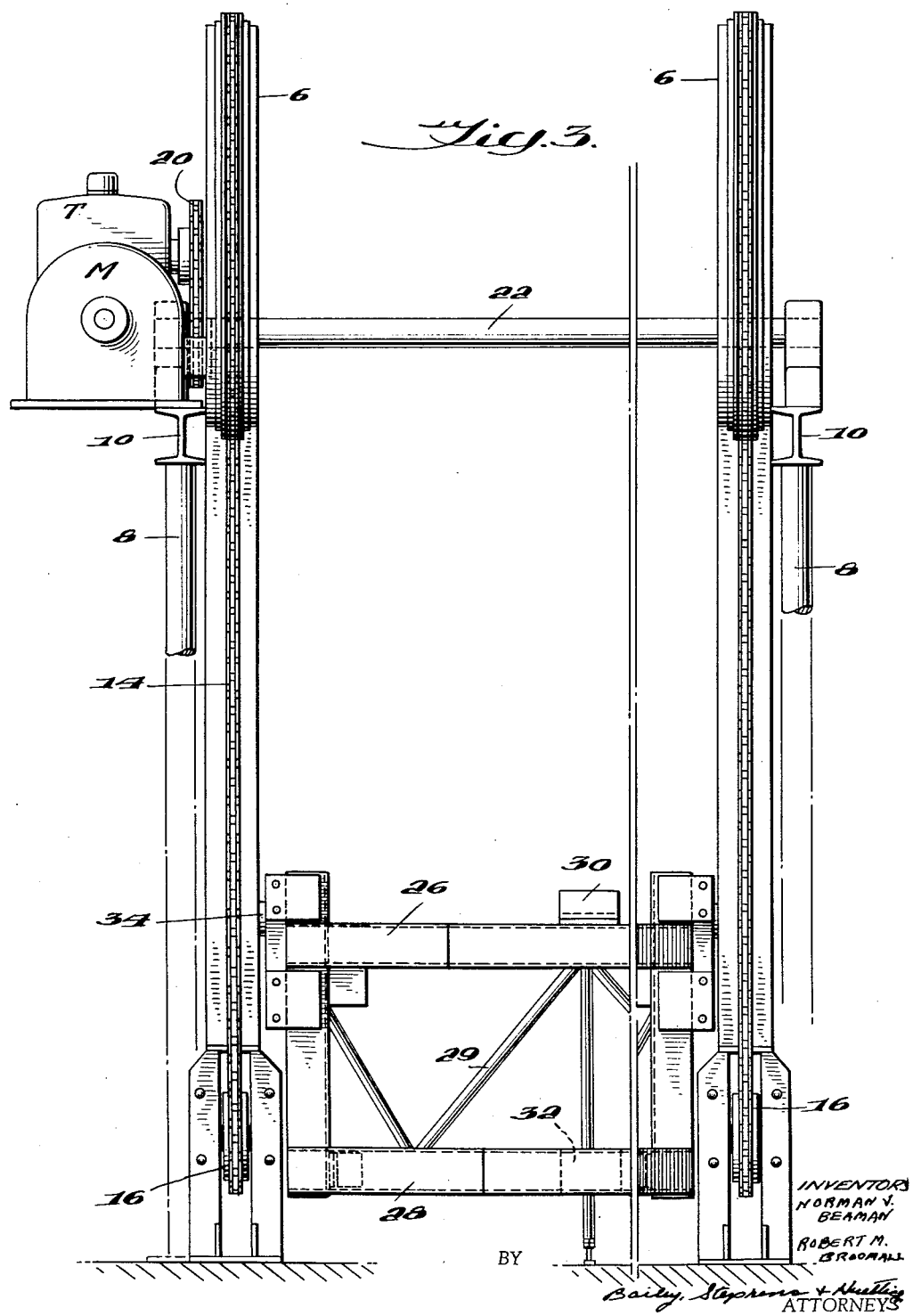
FIGURE 3 is a view of the right side of FIGURE 1.
Figure 4:
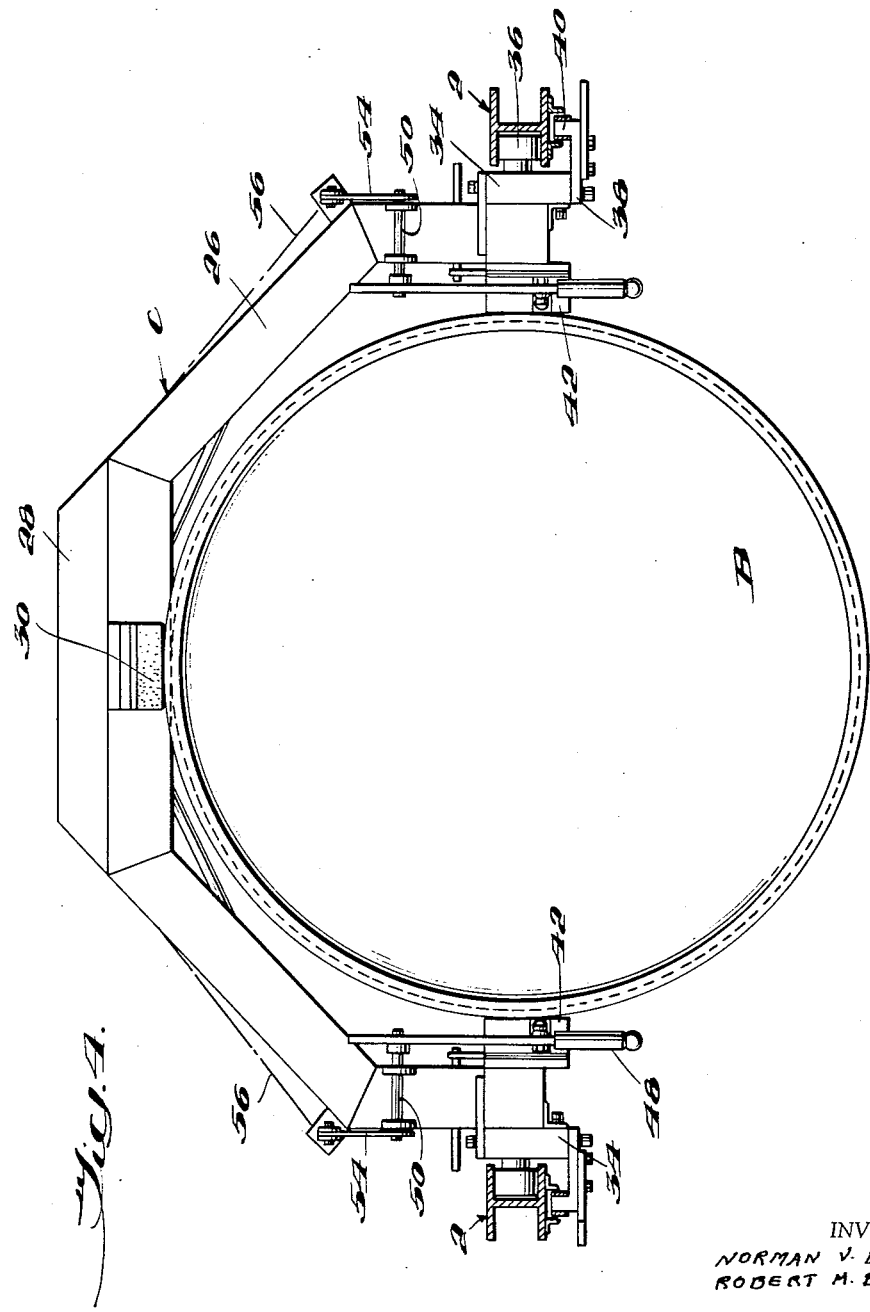
FIGURE 4 is a cross-sectional view on the line 4—4 of FIGURE 1.

As shown in FIGURES 1 to 3, the hoist is composed of a pair of similar tracks 2, each of which has a first vertical portion 4 and a downwardly opening upper curved portion 6 terminating in a second vertical section. As is best shown in FIGURE 1, the curved portion and second vertical section form an inverted U. A pair of columns 8, together with tracks 2, complete the upright framework. Immediately below curved portion 6 are I-beams 10 forming a rectangular horizontal frame. Tracks 2 are in the shape of an H-beam. On the outer face of these beams are welded small angles 12 which form a guideway for the sprocket chain 14. This sprocket chain extends upwardly from a lower sprocket wheel 16 at the base of track 2 to the free end of curved portion 6 and fence over a drive sprocket wheel 18 and back to sprocket wheel 16. Drive sprocket wheel 18 is driven from a motor M connected to gear box T and sprocket chain 20 to sprocket wheel 18. Wheel 18 is mounted on a shaft 22 which connects similar sprocket wheels 18 on each side of the hoist so each of the parent chains is driven in unison. The motor and gear box are carried by beams 10. An adjusting mechanism 24 at the bottom of tracks 2 serves to tension chain 14.

A cradle C is attached to chains 14. This cradle is composed of upper and lower horizontal frames 26 and 28, respectively, connected by struts 29, the frame in the invention as shown being roughly in the shape of a semicircle to accommodate a circular dough bowl. The upper frame has a pad 30 mounted at the rear side thereof with a similar pad 32 mounted on lower frame 28, which are adapted to contact the dough bowl as described hereafter.

Figure 5:
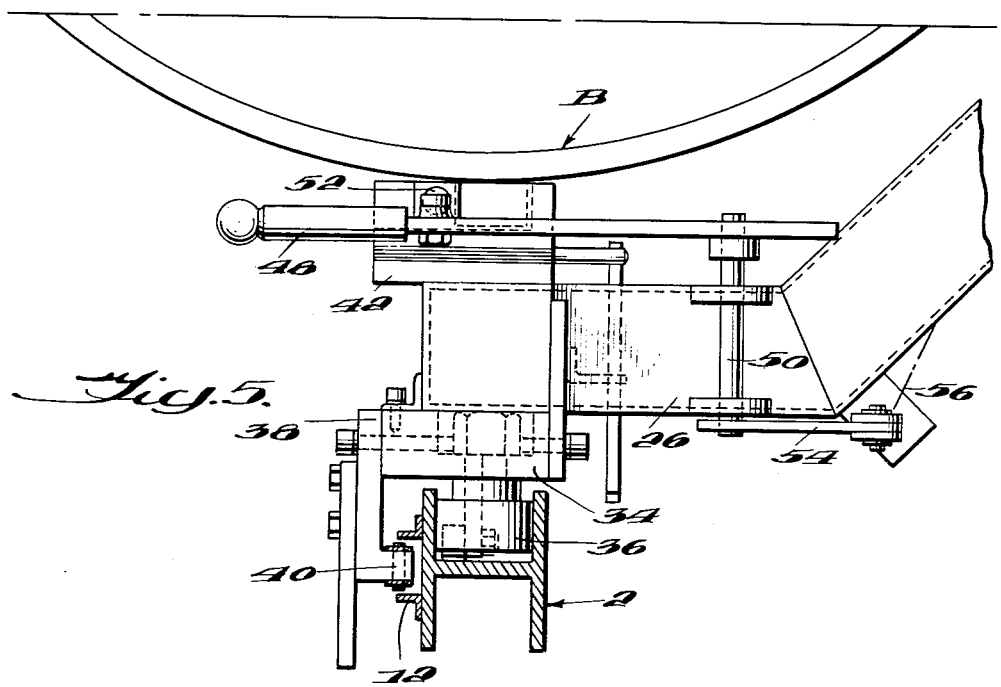
FIGURE 5 is an enlarged detailed view of a portion of FIGURE 4.
Figure 6:
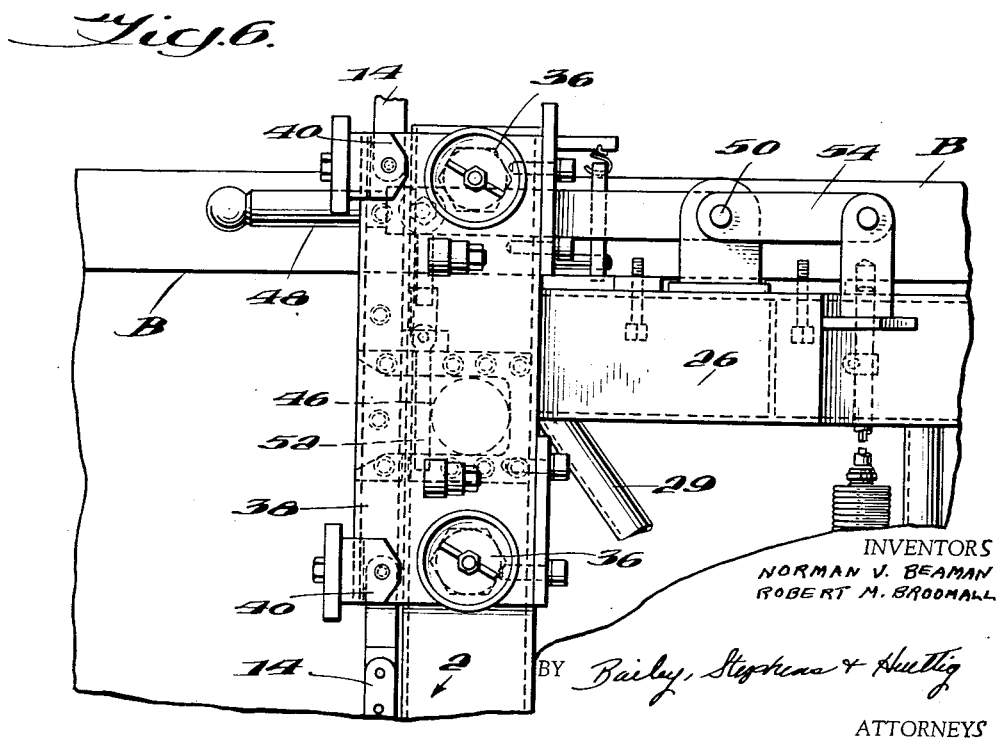
FIGURE 6 is a side view of FIGURE 1 with the track removed.

Secured to the free ends of frame 26 on each side is a plate 34 on which is mounted a first pair of rollers 36 which are adapted to roll between and be guided by the flanges of track 2. A plate 38 fastened to plate 34 extends outwardly of plate 34 and has a pair of lugs 40. Chain 14 is separated and the space between links filled by plate 38 attached to the end chain links by means of lugs 40. Plate 38 thus serves as an elongated link. The distance between the upper and lower lugs 40 is held small enough so that the sprocket chain will not bind against track 2 as it travels over curved portion 6. This overcomes the difficulty of having both the chain 14 and the cradle rollers 36 closely spaced and guided on the H-beam. If the chain was joined to plate 34 in the vertical plane of the axes of the pair of rollers 36, then upon lifting the cradle the rigid piece between the rollers would try to cut across the curved track portion 6 as a chord as its length is less than that of the arc followed by the flexible chain and would bind in the track. This is avoided in this invention by placing the lugs 40 of plate 38 slightly outwardly of rollers 36 as shown in FIGURE 5. The effect is to make the length of plate 38 approximate the length of the arc as a tangent to the arc with the small difference in length being compensated by a slight lifting of the chain on the curved track, which is not objectionable in the actual operation of the apparatus.

Mounted on the innerside of the free end of frame 26 is a plate 42 for receiving and locking in the trunnion of a dough bowl. This plate contains a U-shaped socket 44, FIGURE 2, adapted to receive the trunnion 46 of a bowl B. A handle 48 attached to shaft 50 rotatably carried on frame 26 is linked to a pin 52 vertically slidable through holes across the open end portion of socket 44. Shaft 50 is connected by lever 54 to a push-pull cable mechanism 56 which cable extends from the locking handle on one side of the cradle to the locking handle on the other side of the cradle so that movement of one of the handles simultaneously actuates the other handle.

In operation, the bowl B containing fermented dough and which rolls on casters is pushed into cradle C and the trunnions 46 locked in the sockets 44. The trunnions form two points of support for the bowl in the cradle. The side of the bowl within the cradle is supported against either upper pad 30 or lower pad 32 all depending upon how the bowl swings on trunnions 34 as the cradle is elevated or turned to invert the bowl. The bowl having been locked in the cradle, the motor is started and the chains 14 are moved to lift the cradle and bowl. Rollers 36 guided by the flanges of track 2 follow curved portion 6 and turn the cradle and bowl 90° so that the bowl is substantially half inverted at the position indicated by the dashed line X in FIGURE 1. The bowl in the cradle then travels substantially horizontally in its 90° position to about the position of dashed line Y. During this travel, the dough in the bowl, because of its cohesiveness does not spill out of the bowl, but rather flows down to the lower side of the bowl and separates itself from the upper wall portions of the bowl. The bowl then starts to tilt over to fully inverted position with the lower edge of the bowl barely clearing the upper edge of the hopper H, said edge being closely adjacent to and on the horizontal center line of shaft 22. When the leading roller 44 reaches the end of track 2, the bowl is in fully inverted position and the dough drops out cleanly into hopper H. It is readily apparent that, during the final inverting movements of the bowl, the bowl is shifted downwardly, which downward movement facilitates the discharge of dough from the bowl. During its travel, the bowl is fully supported in the cradle by the two trunnions 34 and by either the pads 30 and 32. The movement of the bowl is smooth, rapid, and efficiently dumps the dough.

The advantages of the apparatus lie in that one workman can move the bowl into the cradle and lock it and dump the bowl by merely pressing a switch to actuate the sprocket chain. The heavy bowl with its dough contents are quickly inverted; and after the bowl has been lowered, it seldom, if at all, needs to be scraped to remove any remaining pieces of dough. This is especially so when the bowl has a central post such as described in Patterson Patent No. 2,869,484. In this bowl, the dough will not fall out cleanly when the bowl is turned 90° from the horizontal because the dough mass shears in sliding across the center post and produces sticky surfaces which cling to the post and wall of the bowl. From 20% to 30% of the dough sticks in the bowl, and must be manually removed. In the 180° inversion of this invention, the dough mass strips cleanly from the bottom, wall and center post of the bowl and scarcely ever leaves any residue in the bowl. Although the dough shifts slightly during bowl turnover time, the elasticity of the dough is such as to make negligible the amount of shifting. The traverse of the chain between lower and upper cradle positions is controlled by conventional limit switches so that the operation of the apparatus does not have to be kept under strict scrutiny by the workman.

Having now described the means by which the objects of the invention are obtained, we claim:

1. A hoist for lifting and dumping a bowl of the type used to contain dough, said hoist comprising two spaced track members, each of said track members comprising a first vertical section, a downwardly opening upper curved section and a second vertical section extending downwardly from said upper curved section with said upper curved section and said second vertical section forming an inverted U, a cradle, means associated with said cradle for mounting a bowl, chain drive means secured to said cradle, motor means for moving said chain, and roller means carried by said cradle for engagement with each of said track members with said cradle being disposed directly under said curved section, said roller means being effective to guide said cradle for longitudinal movement along said track members to raise first said cradle along said first vertical section of the track member and then to invert said cradle a full one hundred and eighty degrees by the engagement of its guide means with the curved section of said track member and the second downwardly extending vertical section of said track member.

2. A hoist for lifting and dumping a bowl of the type used to contain dough, said hoist comprising two spaced track members, each of said track members comprising a first vertical section, a downwardly opening upper curved section and a second vertical section extending downwardly from said upper curved section with said upper curved section and said second vertical section forming an inverted U, a cradle, means associated with said cradle for mounting a bowl, chain drive means secured to said cradle, motor means for moving said chain, and means carried by said cradle for engagement with each of said track members for guiding said cradle for longitudinal movement along said track members to raise first said cradle along said first vertical section of the track member and then to invert said cradle a full one hundred and eighty degrees by the engagement of its guide means with the curved section of said track member and the second downwardly extending vertical section of the track members being such that during the final inverting movement of said cradle the entire cradle is shifted in a downwardly direction, thereby augmenting the gravitational force projecting the dough from said bowl.

3. A hoist for lifting and dumping a bowl of the type used to contain dough, said hoist comprising two spaced track members, each of said track members comprising a first vertical section, a downwardly opening upper curved section and a second vertical section extending downwardly from said upper curved section with said upper curved section and said second vertical section forming an inverted U, a cradle, means associated with said cradle for mounting a bowl, chain drive means secured to said cradle, motor means for moving said chain, and means carried by said cradle for engagement with each of said track members for guiding said cradle for longitudinal movement along said track members to raise first said cradle along said first vertical section of the track and then to invert said cradle a full one hundred and eighty degrees by the engagement of its guide means with the curved section of said track member and the second downwardly extending vertical section of said track member, the curvature of said curved track section, the spacing of the guide means of said cradle and the disposition of said second vertical section being inter-related for first partially inverting the cradle at a first rate of speed and then inverting said cradle at a substantially faster rate of speed.

4. A hoist for lifting and dumping a bowl of the type used to contain dough, said hoist comprising two spaced track members, each of said track members comprising a first vertical section, a downwardly opening upper curved section and a second vertical section extending downwardly from said upper curved section with said upper curved section and said second vertical section forming an inverted U, a cradle, means associated with said cradle for mounting a bowl, chain drive means secured to said cradle, motor means for moving said chain, and means carried by said cradle for engagement with each of said track members for guiding said cradle for longitudinal movement along said track members to raise first said cradle along said first vertical section of the track and then to invert said cradle a full one hundred and eighty degrees by the engagement of its guide means with the curved section of said track member and the second downwardly extending vertical section of said track member, the curvature of said curved track section, the spacing of the guide means of said cradle and the disposition of said second vertical section being inter-related for first partially inverting the cradle at a first rate of speed and then inverting said cradle at a substantially faster rate of speed, the length of said second vertical section of the track members being such that during the final inverting movement of said cradle the entire cradle is shifted in a downwardly direction, thereby augmenting the forces projecting the dough from said bowl.

5. A hoist for lifting and dumping a bowl of the type used to contain dough, said hoist comprising two spaced track members, each of said track members being of H shaped cross section and comprising a first vertical section, a downwardly opening upper curved section and a second vertical section extending downwardly from said upper curved section with said upper curved section and said second vertical section forming an inverted U, a cradle, means associated with said cradle for mounting a bowl, chain drive means secured to said cradle, each of said track members having a channel shaped chain guideway on an outer surface thereof, motor means for moving said chain, and roller means carried by said cradle for engagement with each of said track members with said cradle being disposed directly under said curved section, said roller means being effective to guide said cradle for longitudinal movement along said track members to raise first said cradle along said first vertical section of the track member and then inverting said cradle a full one hundred and eighty degrees by the engagement of its guide means with the curved section of said track member and the second downwardly extending vertical section of said track member, the points of attachment of said chain to said cradle being spaced from one another and being displaced outwardly from said frame.

6. A hoist for lifting a bowl containing dough and dumping the dough into a hopper comprising a cradle for carrying a bowl, socket means on said cradle for supporting said bowl at two opposite points located between the top edge and horizontal center line of said bowl, bowl pads located on the upper and lower portions of said cradle, respectively, at positions displaced ninety degrees of said socket means for supporting said bowl at at least one third point during its elevation and inversion, chain means connected to said cradle for lifting said cradle, and trackway means for guiding said chain means to lift the cradle and bowl vertically, turn the cradle ninety degrees while advancing the cradle and bowl to start a flow of the dough within said bowl, and then fully inverting the bowl above a hopper to drop all of the dough cleanly from said bowl into said hopper.

References Cited in the file of this patent

UNITED STATES PATENTS

| | | |
|---|---|---|
| 1,028,762 | Lutze | June 4, 1912 |
| 1,755,547 | Lima | Apr. 22, 1930 |
| 1,763,560 | Amendolara | June 10, 1930 |
| 1,780,064 | Buzzo | Oct. 28, 1930 |
| 2,456,434 | Manthie | Dec. 14, 1948 |
| 2,888,157 | Riley | May 26, 1959 |
| 2,917,192 | Ricker et al. | Dec. 15, 1959 |

FOREIGN PATENTS

| | | |
|---|---|---|
| 558,499 | Great Britain | Jan. 7, 1944 |